US009819761B2

(12) United States Patent
Hind et al.

(10) Patent No.: US 9,819,761 B2
(45) Date of Patent: *Nov. 14, 2017

(54) INTELLIGENT CLIENT CACHE MASHUP FOR THE TRAVELER

(71) Applicant: International Business Machines Corporation, Armonk, NY (US)

(72) Inventors: John R. Hind; Bhavuk Srivastava, Magarpatta (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,075

(22) Filed: Feb. 22, 2016

(65) Prior Publication Data
US 2016/0173638 A1   Jun. 16, 2016

Related U.S. Application Data

(63) Continuation of application No. 14/607,567, filed on Jan. 28, 2015, now Pat. No. 9,300,750, which is a
(Continued)

(51) Int. Cl.
*G06F 17/30* (2006.01)
*H04L 29/08* (2006.01)
(Continued)

(52) U.S. Cl.
CPC ...... *H04L 67/2842* (2013.01); *G06F 17/3056* (2013.01); *G06F 17/30598* (2013.01);
(Continued)

(58) Field of Classification Search
CPC .. G06Q 10/109; G06Q 10/1095; G06Q 50/01; G06F 17/3056; G06F 17/30598;
(Continued)

(56) References Cited

U.S. PATENT DOCUMENTS 6,963,826 B2   11/2005   Hanaman et al.
7,149,288 B2   12/2006   Digate et al.
(Continued)

OTHER PUBLICATIONS

Azer Bestavros, et al., Application-Level Document Caching in the Internet, Proceedings of the Second International Workshop on Services in Distributed and Networked Environments, 1995, pp. 1-13, Published/retrieved via web.archive.org at: http://www.cs.bu.edu/faculty/crovella/paper-archive/www-sdne95/paper.html.
(Continued)

*Primary Examiner* — Thanh-Ha Dang
(74) *Attorney, Agent, or Firm* — Lee Law, PLLC; Christopher B. Lee

(57) ABSTRACT

A determination is made as to whether a message received at a first client application cache of a group of client application caches matches one of a set of stored rules. Each rule triggers an event in another one of the group of client application caches in response to receipt of a matching message from a client application. Another message directed to another specified client application cache is generated for each rule determined to match the received message at a first client application cache. The generated message directs the other specified client application cache to collect and cache specified information from a server associated with the other specified client application cache.

20 Claims, 5 Drawing Sheets

Related U.S. Application Data continuation of application No. 11/946,330, filed on Nov. 28, 2007, now Pat. No. 8,990,269.

(51) Int. Cl.
  *G06Q 10/10* (2012.01)
  *G06Q 50/00* (2012.01)

(52) U.S. Cl.
  CPC ....... *G06Q 10/109* (2013.01); *G06Q 10/1095* (2013.01); *G06Q 50/01* (2013.01); *H04L 67/02* (2013.01); *H04L 67/10* (2013.01); *G06F 17/30424* (2013.01); *G06F 17/30902* (2013.01)

(58) Field of Classification Search
  CPC ......... G06F 17/30424; G06F 17/30902; H04L 67/2842; H04L 67/02; H04L 67/10
  USPC ....................................................... 707/812
  See application file for complete search history.

(56) References Cited

U.S. PATENT DOCUMENTS

| | | | | |
|---|---|---|---|---|
| 7,383,303 | B1* | 6/2008 | Bort .................... | G06Q 10/109 379/201.01 |
| 2002/0154178 | A1 | 10/2002 | Barnett et al. | |
| 2003/0195918 | A1 | 10/2003 | Horn et al. | |
| 2004/0205134 | A1 | 10/2004 | Digate et al. | |
| 2005/0064911 | A1 | 3/2005 | Chen et al. | |
| 2006/0095859 | A1* | 5/2006 | Bocking ............. | G06Q 10/109 715/764 |
| 2006/0123082 | A1 | 6/2006 | Digate et al. | |
| 2006/0234735 | A1 | 10/2006 | Digate et al. | |
| 2006/0235957 | A1* | 10/2006 | Faucher ............. | H04L 67/2842 709/223 |
| 2007/0016646 | A1* | 1/2007 | Tendjoukian ........ | G06Q 10/109 709/206 |
| 2007/0129986 | A1* | 6/2007 | Barnett ............ | G06Q 10/0631 4 715/767 |
| 2007/0253424 | A1 | 11/2007 | Herot et al. | |
| 2008/0010381 | A1 | 1/2008 | Barraclough et al. | |
| 2008/0027955 | A1 | 1/2008 | May et al. | |
| 2008/0034315 | A1 | 2/2008 | Langoulant et al. | |
| 2008/0235287 | A1 | 9/2008 | Bocking et al. | |
| 2009/0036148 | A1 | 2/2009 | Yach | |
| 2009/0043627 | A1 | 2/2009 | Vaidya et al. | |
| 2013/0041921 | A1 | 2/2013 | Cooper et al. | |
| 2015/0058425 | A1* | 2/2015 | Nathan ................. | H04L 65/403 709/206 |

OTHER PUBLICATIONS

Author Unknown, CompuLaw Announces new PIM Synchronization Program, Webpage/site, Jan. 9, 2002, pp. 1-2, CompuLaw.com, Published/retrieved via web.archive.org at: http://www.compulaw.com/press_release/PIM_SYNC.htm.

M. S. Day, Client Cache management in a Distributed Object Database, Abstract, 1995, pp. 1-2, Massachusetts Institute of Technology, Cambridge, MA.

Sumi Helal, et al., A Three-tier Architecture for Ubiquitous Data Access, Proceedings of the First ACS/IEEE International Conference on Computer Systems and Applications, Jul. 2001, pp. 177-180, Published online at: http://www.cise.ufl.edu/~jhammer/publications/ACS2001/ACS2001.pdf.

Dion Hinchcliffe, Is IBM making enterprise mashups respectable?, Webpage/site, Jun. 18, 2006, pp. 1-6, CNET Networks, Inc., Published/retrieved via web.archive.org at: http://blogs.zdnet.com/Hinchcliffe/?p=49.

Wei-Che Huang, et al., Pocket RikWik: A Mobile Wiki Supporting Online and Offline Collaboration, Article, 2006, Southern Cross University, Published/retrieved via web.archive.org at: http://ausweb.scu.edu.au/aw06/papers/refereed/roe/paper.html.

Geoffrey H. Kuenning, et al., Automated Hoarding for Mobile Computers, Proceedings of the 16th ACM Symposium on Operating Systems Principles, Oct. 1997, pp. 1-2, Association for Computing Machinery, Inc., Published/retrieved via web.archive.org at: http://www.it.iitb.ac.in/~it601/papers/seer.pdf.

Author Unknown, LDAP Directory Synchronization, Webpage/site, 2000, pp. 1-9, Software.com, Inc., Published/retrieved via web.archive.org at: http://support.openwave.com/docs/emailkx/docs/books/4.3/html/isd/dap_dir.htm.

Brad Marshall, Introduction to LDAP, Webpage/site, Archived Oct. 19, 2007, pp. 1-24, Quark.humbug.org, Published/retrieved via web.archive.org at: http://support.openwave.com/docs/emailkx/docs/books/4.3/html/isd/dap_dir.htm.

Philip Meehan, Boot Camp Mashing for Beginners, Webpage/site, 2004, pp. 1-8, Painting by Numbers, Published/retrieved via web.archive.org at: http://www.paintingbynumbers.com/bootcamp/.

Author Unknown, PIM Synchronization: A Solution for ISPs & Fixed-Line Telcos, Article: Memova Messaging, 2005, pp. 1-2, Critical Path, Inc., Published/retrieved via web.archive.org at: http://www.criticalpath.net/pdf/DS_sync_fixed.pdf.

Robert Moskowitz, Road warrior: How to make better use of your business travel time, Webpage/site, 2000, pp. 1-2, Robert Moskowitz, Published/retrieved via web.archive.org at: http://www.media3pub.com/usbank/articles/road_warrior.html.

Author Unknown, Considerations for a Multi-Library NOTEbookS Environment, Article, Archived Dec. 12, 2004, pp. 1-4, Rasco.corn, Published/retrieved via web.archive.org at: http://www.rasco.com/PDFFiles/Multi-SiteNOTEbooks.PDF.

Author Unknown, Shared Address Books, Webpage/site, Oct. 12, 2007, pp. 1-3, Slipstick Systems, Published/retrieved via web.archive.org at: http://www.slipstick.com/addins/groupcontacts.htm.

Carl Tait, et al., Intelligent File Hoarding for Mobile Computers, Proceedings of the 1st Annual International Conference on Mobile Computing and Networking, 1995, pp. 119-125, Association for Computing Machinery, Inc., Published/retrieved via web.archive.org at: http://citeseer.ist.psu.edu/rd/0%2C553529%2C1%2C0.25%2CDownload/http:/citeseer.ist.psu.edu/cache/papers/cs/26981/http:zSzzSzwww-2.cs.cmu.eduzSzafszSzcs.cmu.eduzSzuserzSzsatyazSzWebzSzMCSALINKzSzPAPERSzSztait95.pdf/tait95intelligent.pdf.

Mark Nottingham, Caching Tutorial for Web Authors and Webmasters, Webpage/site, Printed from website on Aug. 26, 2014, pp. 1-20, Mark Nottingham, Published online at: http://www.mnot.net/cache_docs/.

U.S., Office Action for U.S. Appl. No. 11/946,330, dated Apr. 2, 2010, pp. 1-11, Alexandria, VA, USA.

U.S., Office Action for U.S. Appl. No. 11/946,330, dated Sep. 16, 2010, pp. 1-18, Alexandria, VA, USA.

U.S., Examiner's Answer for U.S. Appl. No. 11/946,330, dated May 27, 2011, pp. 1-26, Alexandria, VA, USA.

U.S., Decision on Appeal for U.S. Appl. No. 11/946,330, dated May 15, 2014, pp. 1-6, Alexandria, VA, USA.

U.S., Notice of Allowance for U.S. Appl. No. 11/946,330, dated Jul. 23, 2014, pp. 1-21, Alexandria, VA, USA.

U.S., Notice of Allowance for U.S. Appl. No. 11/946,330, dated Oct. 30, 2014, pp. 1-24, Alexandria, VA, USA.

U.S., Office Action for U.S. Appl. No. 14/607,567, dated Aug. 26, 2015, pp. 1-16, Alexandria, VA, USA.

U.S., Notice of Allowance for U.S. Appl. No. 14/607,567, dated Dec. 24, 2015, pp. 1-8, Alexandria, VA, USA.

\* cited by examiner

| TYPE | HANDLE | TARGET DATE | PATTERN | COUNT |

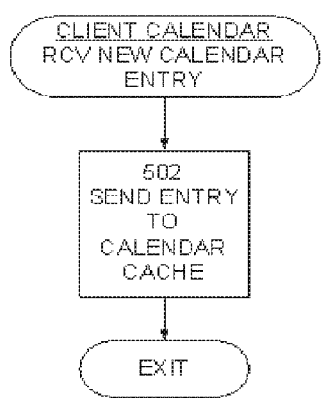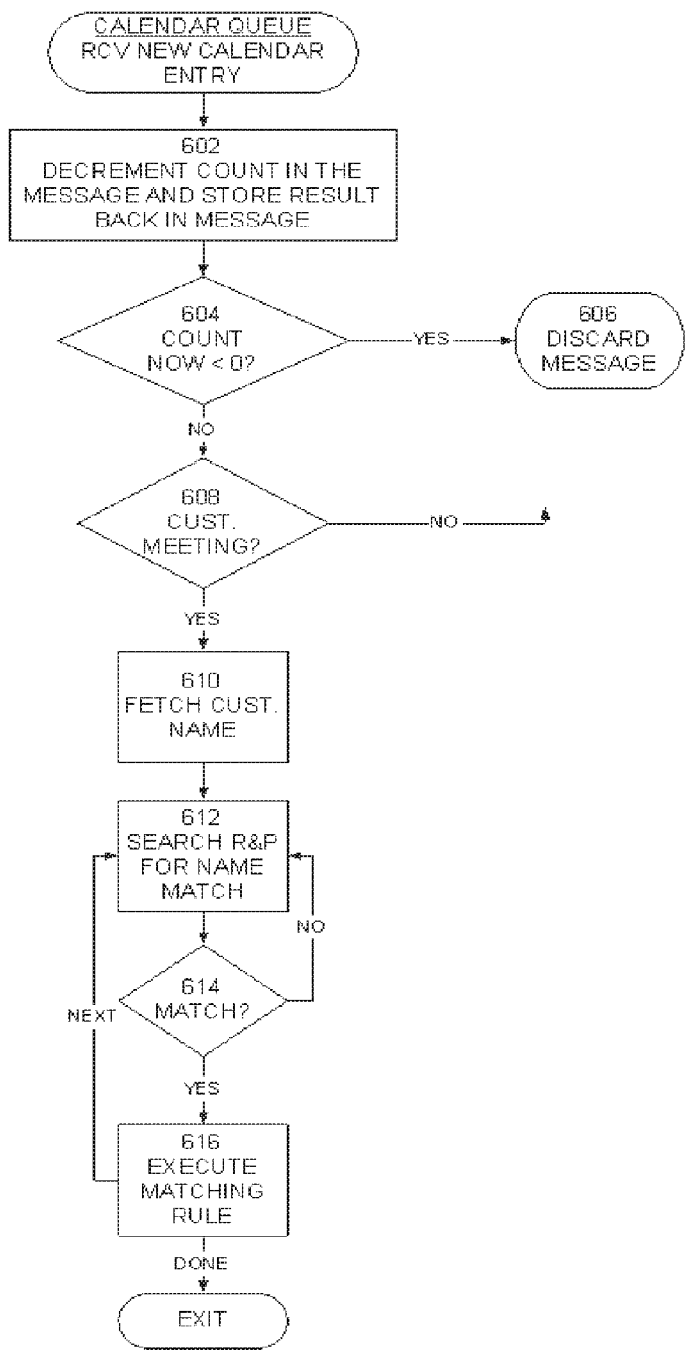

INTELLIGENT CLIENT CACHE MASHUP FOR THE TRAVELER

BACKGROUND

The invention relates to automated services, and especially to the automated collection of data and information for personal information managers, personal data assistants (PIM and PDAs), laptops and any type of electronic device that individuals might use in a mobile environment for the containment of personal and business information.

Many of today's organizations are going global, meaning that employees located in one geography might need to interact with their counterparts and customers in another remote geography. In a recent survey conducted in the US, it was found that, last year, American "road warriors" (business people) took 207 million business trips, spending an average of about three and a half days away from the office per trip. (<<media3pub.com/usbank/articles/road_warrior.html>>). Because of this shifting paradigm, employees are often working at remote locations with limited or no real-time access to needed corporate or personal information.

One of the big inhibitors to productivity in this environment is the inability to access needed information to accomplish short term tasks, like finding the right person in a back-office to answer a question, or perhaps reviewing the purchase history of a customer before tomorrow's meeting. Even though many organizations have their own corporate directory holding employee and customer information, they need a way to always have access at their mobile devices to the latest and authentic information available, along with important related business information.

What is needed is a way to ensure that important information is available in one's laptop or mobile device, regardless of where the user might be.

The above problem statement brings forth a number of issues, including the size of corporate databases that encompass multimedia elements, such as graphics, pictures, maps, even video presentations. Important business information might also include information found in customer relations management (CRM) systems, social link networks, blogs, etc.

According to the Wikipedia website (<<wikipedia.org/>>), a mashup is a website or web application that uses content from more than one source to create a completely new service. The origin of the term "mashup" comes from the music industry where a DJ mixes a vocal track from one song with the instrumental track of another. Recently, mashups have started to appear in non-browser based applications like instant messaging, where plug-ins are used to produce compositions of information for end users, like showing directory and social networking data in a chat window. The focus of mashups at the present has been on producing real time compositions for an end user.

There is a long history of caching techniques for specific application domains, such as for relational databases, email systems, and for edge servers in the web. Some of these cache techniques have intelligent features that preload elements of the associated application domains. For example, one known email application fetches copies of email messages when their titles appear on screen in representation of the in-box; a known database application prefetches related table subsets when some table rows are retrieved, if there has been a history of the database application using a query to "join" these related table subsets.

There have also been attempts to replace multiple application access to remote data in mobile devices with a specialized data access client, a matching server extension and an optional middle tier. In this arrangement rules were used to allow those files that were most likely to be needed, based on recent history, to be copied to a mobile device before the device disconnected from a network.

SUMMARY

The invention provides a data mashup on a user's device. The preferred and probably most useful device is a mobile one. However, there is no reason to so limit the invention. When the user makes an application data entry, such as a calendar entry for a meeting with a customer, the mashup uses rules and data patterns that have been defined by the user to query other relevant information sources to collect related information about the customer or the meeting, and to cache the collected information on the device for the user. A computer-implemented method includes determining whether a message received at a first client application cache of a group of client application caches matches one of a set of stored rules, where each rule triggers an event in another one of the group of client application caches in response to receipt of a matching message from a client application; and generating, for each rule determined to match the received message at the first client application cache, another message directed to another specified client application cache that directs the other specified client application cache to collect and cache specified information from a server associated with the other specified client application cache. A client computer that performs the computer-implemented method, and a storage medium that contains code that, when executed by a computer that executes at least a first client application cache, causes the first client application cache executed by the computer to perform the computer-implemented method are also described.

BRIEF DESCRIPTION OF THE DRAWINGS

A better understanding of the invention will be had when the following detailed description is read in conjunction with the drawings in which:

FIG. 5 shows illustrative process steps performed at a client application, such as a calendar client application;

FIG. 6 shows illustrative process steps performed at an application cache, such as a calendar cache application according to the invention.

DETAILED DESCRIPTION

Figure 1:
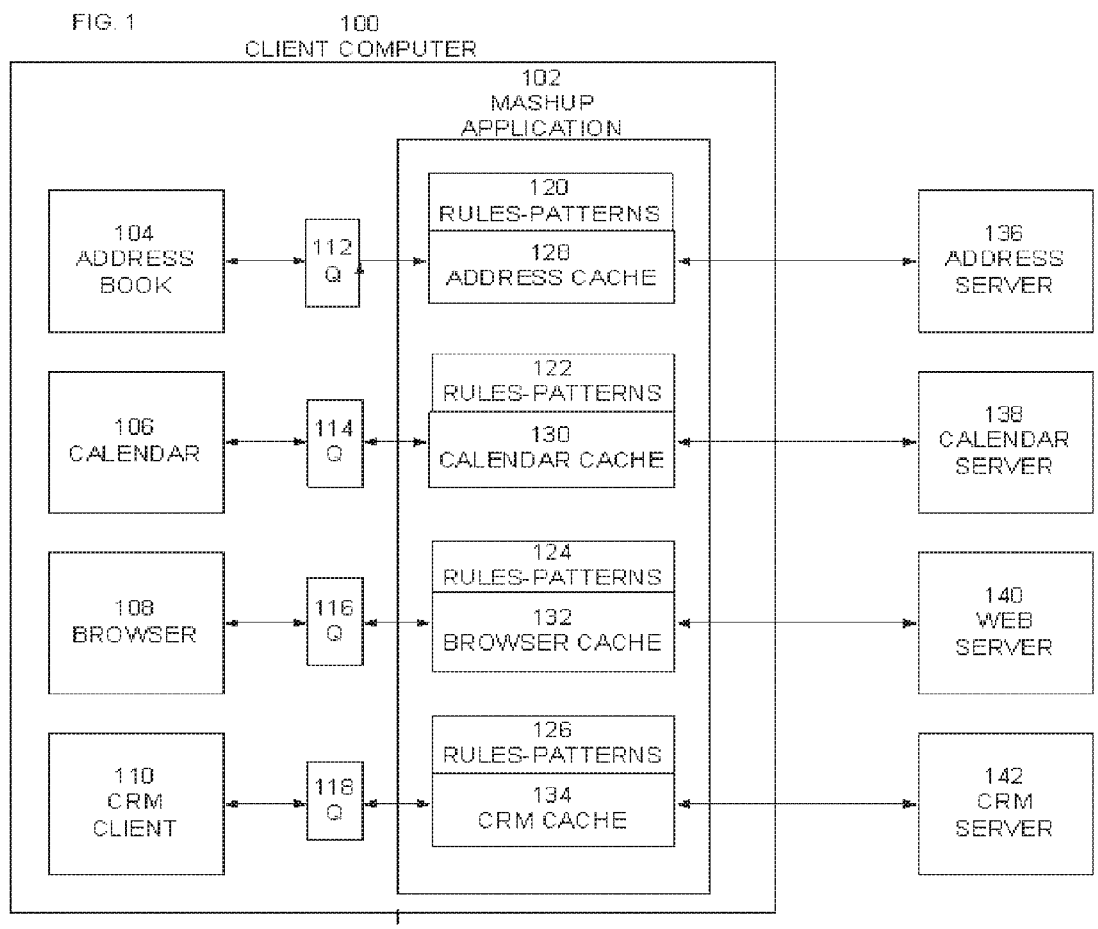
FIG. 1 is a block diagram of an illustrative cache mashup system, including client applications, application caches, application servers, and a message queuing system for communications between these system components.

FIG. 1 shows a block diagram of a client computer with a number of Illustrative software applications, which are be used to describe the invention. For example, client computer 100 contains an address book 104, a calendar application 106, a web browser 108 and a customer relations manager (CRM) 110.

These applications are logically connected to a cache mashup application 102 by message queues 112, 114, 116 and 118, which in turn are respectively connected to caches 128, 130, 132 and 134 that are respectively associated with the mentioned client applications. The message queues are used to pass messages between the client applications and the mashup and can be implemented with IBM's Message Queuing system. Each of the caches is also, by way of example, connected to a backend server that services the respective client application. For example, address book 104 is associated with a backend address server 136, Calendar 106 is associated with backend calendar server 138, and so on for browser 108 and web server 140, and CRM 110 and server 142. Each of the mashup caches is also illustratively associated with a rules and pattern (R&P) module. For example, address cache 128 is associated with R&P 120; calendar cache 130 is associated with R&P 122 and so on for R&P 124 and R&P 126 for the browser and CRM caches. These R&P modules contain information entered by a user of the client computer to control the actions that are taken when the user enters or deletes information in a backend server via one of the client applications.

Figure 2:
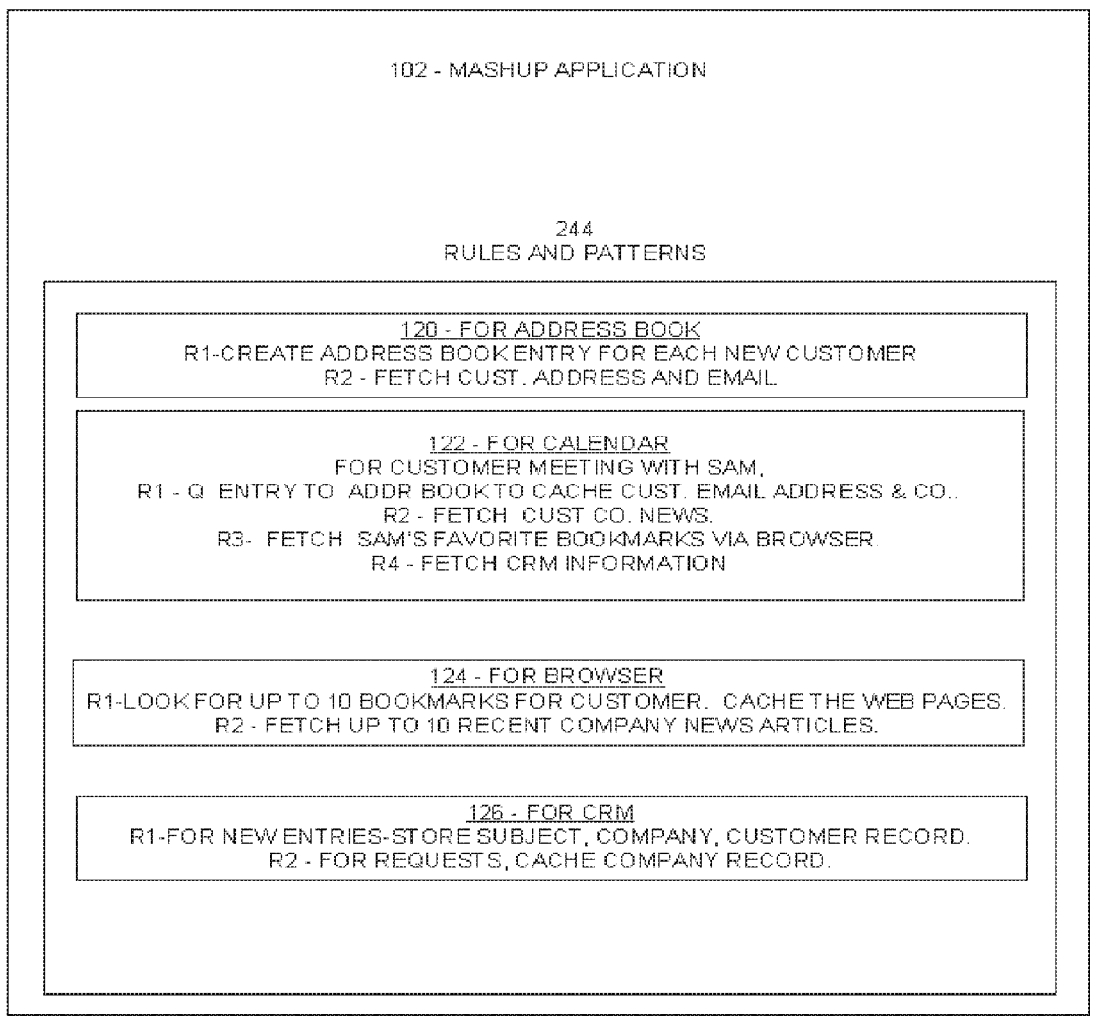
FIG. 2 shows illustrative user-defined rules that govern the operation of the system in response to user entries into client applications, such as calendars, browsers and similar client applications.

FIG. 2 shows one illustrative example of a set of rules that a user might enter into the R&P modules. The focus is primarily on the calendar application 106 and calendar cache 130. The example chosen to illustrate the invention is one in which a user wishes a calendar entry for a customer meeting to initiate a series of actions that automatically collects customer information likely to be useful for the user to prepare for the meeting. There is no intention to limit the invention to this example. It is merely illustrative of the types of actions that a user might find useful. Thus, in R&P 122, the user has entered rule RI that instructs the calendar cache 130 that for every new scheduled customer meeting with Sam, initiate actions to the other client applications so that the mashup collects the email address of Sam and employer company name from the address server. Rule R2 of 122 instructs the mashup to fetch some recent news articles from a designated news source, such as the Wall Street Journal, and cache them at browser cache 132. Rule R3 instructs the mashup that for a customer meeting with Sam, fetch Sam's most favorite web bookmarks. For R3, the rule would contain a social networking URL, such as <<del.icio.us>> to query for Sam's bookmarks.

Figures 3, 4:
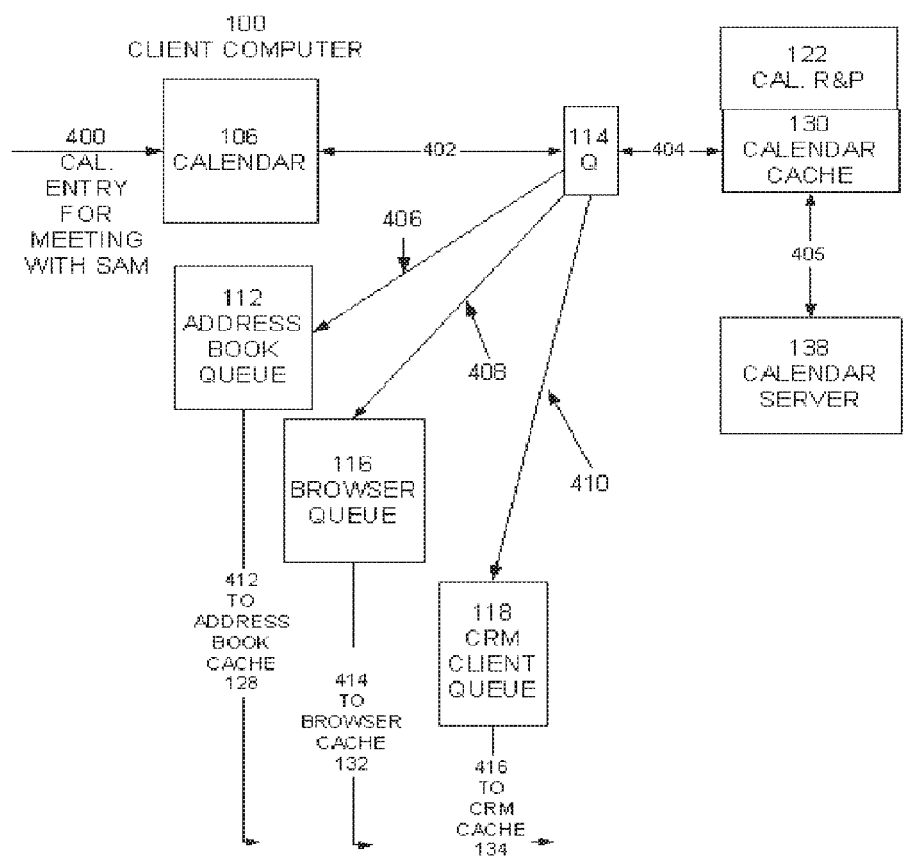
FIG. 3 shows one illustrative format of messages that are passed in the system of FIG. 1.
FIG. 4 is a simplified and illustrative block diagram of the system of FIG. 2 to illustrate operations of the invention in response to the entry of a meeting into a client calendar application.

With reference to FIG. 4, which is a simplified and re-arranged system view to aid this description, as a result of a user entering at 400 a calendar entry for a customer meeting with Sam, a meeting entry is made into Sam's calendar at the calendar server 138 via a message sent from the calendar client 106 via communication link 402, queue 112, calendar cache 130 and links 404 and 405. This user entered message contains a COUNT field set to the integer value one (1) to prevent the client application from discarding the message for a reason that will become apparent from the following discussion. As that calendar entry is being made, calendar cache 130 also queries R&P 122 to determine which, if any, user rules might be triggered by the contents of the calendar message. Since this is a customer meeting with Sam, rules R!, R2, R3 and R4 are triggered. As a result of R1, calendar cache 130 queues a message in queue 114 via logical connection 406 to the queue 112 that serves the address book cache 104 to fetch Sam's company address and his email address from the address server 136.

When this message arrives at the address cache 128, it triggers rule R2 to fetch and cache the desired information. Of course, it is assumed for this example, that this information for Sam has previously been entered into the address server by the user. FIG. 3 shows an example of what this message might look like. In FIG. 3, TYPE is set to ADDR, meaning fetch information from the address server. HANDLE is set to Sam to identify the party whose address information is desired. TARGET DATE is set to the date of the meeting; PATTERN might be set to other information specific to the type of message being generated, but is empty for this message in this preferred embodiment; COUNT is set to an arbitrary integer greater than zero to prevent the looping of messages. This will be explained in more detail later. The purpose of this message to the address book cache is to store Sam's address information from the address server 136 into the user's address cache 128 The TARGET DATE prevents the stored address information from being deleted from the address cache before it is needed.

The original meeting entry message at calendar cache 130 also triggers rules R2, R3 and R4 of the calendar R&P 122. Rule R2 results in the generation and queuing in queue 114 of a message to the browser cache 132 via logical link 408 and connection 414 to fetch, in this example, recent news articles regarding the company that employs Sam. The HANDLE of rule R2 will contain the company name taken from R&P 122. It is also possible to fetch this information from the address book if desired, but this requires a slightly more complicated application at the calendar cache 130. For this message, rule R2 of R&P 122 contains a user-entered URL of a desired news source for Sam's company and is stored in PATTERN of the generated message to browser application 108. This might be, for example, <<.wsj.com>> identifying the Wall Street Journal web site. Rule R2 could also contain a number, say 10, to limit the number of news articles that will be retrieved, but in this simplified embodiment, the number is placed in the rules of the other client applications. This message triggers rule R2 in the browser R&P 124.

Rule R3 also results in a second message to the browser cache 132 to fetch Sam's favorite bookmarks. This message in this example is related to social networking web sites to fetch and store in the user's browser cache 132 a number of items that illustrate the likes, or perhaps dislikes, of Sam. In this example, assuming that Sam participates in social networking, Sam's favorite Web bookmarks are used for this purpose. TYPE of the message is set to BROWSER to identify the browser cache, HANDLE is set to <<del.icio.us/sam>> to identify the location of Sam's stored favorite bookmarks. This particular site is only an example of course. There can be any number of social networking web sites at any given time that a user might wish to use. This message triggers rule R1 in the browser R&P 124.

Rule R4 at calendar cache R&P 122 triggers a message to queue 112 to the CRM cache 134 via logical link 410 and connection 416. The purpose of this message is to store information about Sam into CRM cache 134 from the user's internal CRM server 142. TYPE is set to CRM and HANDLE is set to Sam. Again, COUNT is set to some arbitrary integer greater than zero. This message triggers rule R2 of the CRM R&P 126.

FIG. 5 shows an illustrative flowchart of the steps taken to implement the invention at the calendar client application. When a user enters a new calendar entry, step 502 at the calendar application generates and sends an appropriate message to the calendar cache to initiate operations as above described.

FIG. 6 shows illustrative steps at the calendar cache 130 that are performed in response to the receipt of a message from the calendar client. Step 602 retrieves the integer in the COUNT field of the incoming message, decrements the value by 1 and stores the resulting integer back into the COUNT field. Step 604 next examines the value of the decremented integer. If it is less than zero (0), step 606 discards the message. This prevents incoming requests from generating an infinite number of messages as a result of the triggering of other rules that might be stored at the various cache R&P's. If the value of the decremented COUNT is not negative, step 608 determines if this is a customer meeting entry. If not, calendar cache 130 performs other appropriate steps in this example, such as merely sending the entry onto the backend calendar server 138. If this is an entry for a customer meeting, step 610 fetches the customer name from the incoming message and step 612 searches the calendar R&P 122 to determine which, if any, rules are matched. As each matching rule is found as determined at step 614, step 616 executes the rule, which in the typical case causes the calendar cache 130 to generate an outgoing message to one of the client applications, as above described, to initiate an appropriate action to cache the desired information. As mentioned, the meeting date included in each outgoing message to the client applications prevents the caches from deleting the retrieved information from the caches until after the meeting.

It is noted, that each of the client application caches will perform steps similar to those described above. It is also noted that an application cache may delay caching the data described by a queued request to a time just prior to the target date in the request. For example, the browser cache might delay retrieving the bookmarks requested by calendar rule R3 until, say, three days before the calendar meeting, which is the target date in the respective queued request.

Figure 7:
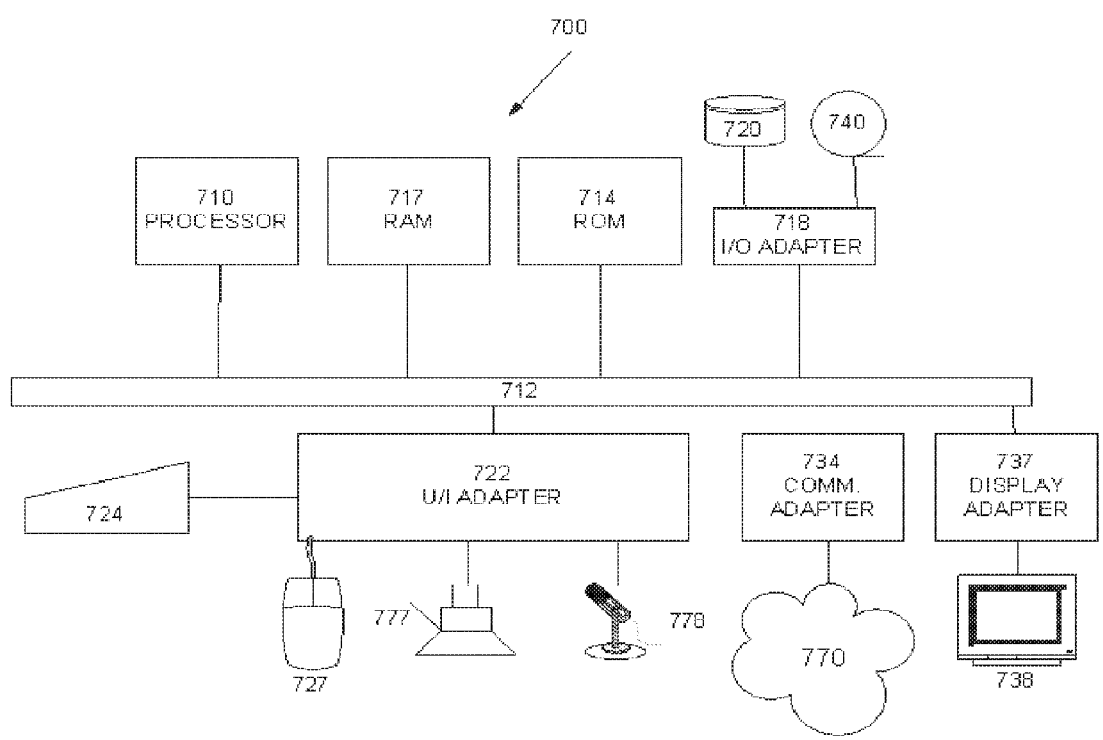
FIG. 7 is a block diagram of a laptop computer or other illustrative device suitable for practicing the invention.

FIG. 7 illustrates a simplified example of an information handling system that may be used to practice the present invention. The invention may be implemented on a variety of hardware platforms, including embedded systems, personal computers, workstations, servers, and mainframes. The computer system of FIG. 7 has at least one processor 710. Processor 710 is interconnected via system bus 712 to random access memory (RAM) 717, read only memory (ROM) 714, and input/output (I/O) adapter 718 for connecting peripheral devices such as disk unit 720 and tape drive 740 to bus 712. The system has a user interface adapter 722 for connecting a keyboard 724, a mouse 727, or other user interface devices such as audio output device 777 and audio input device 778 to bus 712. The system has a communication adapter 734 for connecting the information handling system to a data processing network 770, and display adapter 737 for connecting bus 712 to a display device 738. Communication adapter 734 may link the system depicted in FIG. 7 with hundreds or even thousands of similar systems, or other devices, such as remote printers, remote servers, or remote storage units. The system depicted in FIG. 7 may be linked to both local area networks (sometimes referred to as intranets) and wide area networks, such as the Internet.

It will be appreciated that the computer system 700 illustrated in FIG. 6 is merely illustrative, and is not meant to be limiting in terms of the type of system which may provide a suitable operating environment for practicing the present invention. While the computer system described in FIG. 7 is capable of executing the processes described herein, this computer system is simply one example of a computer system. Many systems are capable of performing the processes of the invention.

Artisans in the field of this invention will quickly realize that the preferred and disclosed embodiment can have many variations that are within the intent and scope of the teaching. It is the intent of the inventor to encompass these variations to the extent possible in accordance with the state of the applicable relevant art in the field of the invention.

What is claimed is:

1. A computer-implemented method, comprising:
    determining whether a message received at a first client application cache of a plurality of client application caches matches one of a set of stored rules, where each rule triggers a processing event in another one of the plurality of client application caches in response to receipt of a matching message from a client application; and
    generating, for each rule determined to match the received message at the first client application cache, another message directed to another specified client application cache that triggers the processing event in the other specified client application cache that causes the other specified client application cache to perform programmatic processing to collect and cache specified information from a server associated with the other specified client application cache.

2. The computer-implemented method of claim 1, where:
    the first client application cache comprises a calendar cache associated with a client calendar application that is associated with a calendar server and the other specified client application cache comprises an address book client cache; and
    a matching rule stored in association with the calendar cache causes transmission of the respective other message to the address book client cache that causes the address book client cache to collect customer information in response to a customer meeting entered from the client calendar application.

3. The computer-implemented method of claim 1, where the first client application cache comprises a calendar cache associated with a client calendar application that is associated with a calendar server, and a matching rule stored in association with the calendar cache causes the respective other message to be transmitted to a social networking web site that causes the social networking web site to collect customer information in response to a customer meeting entered from the client calendar application.

4. The computer-implemented method of claim 3, where the social networking web site is specified in the matching rule stored in association with the calendar cache.

5. The computer-implemented method of claim 1, where the first client application cache comprises a calendar cache associated with a client calendar application that is associated with a calendar server, and a matching rule stored in association with the calendar cache causes transmission of the respective other message to a database that causes the database to collect customer information in response to a customer meeting entered from the client calendar application.

6. The computer-implemented method of claim 1, where each message comprises a COUNT field that comprises a positive integer, and further comprising, at each client application cache, decrementing a value in the COUNT field and discarding the respective other message in response to the respective decremented value reaching a certain value.

7. The computer-implemented method of claim 1, where the message comprises a target date of a future event, and further comprising delaying retrieval of the cached specified information until just before the future event.

8. A client computer comprising a plurality of client applications and a plurality of client application caches, comprising:
- a memory comprising at least a first client application cache; and
- at least one processor programmed to:
  - determine whether a message received at the first client application cache of the plurality of client application caches matches one of a set of stored rules, where each rule triggers a processing event in another one of the plurality of client application caches in response to receipt of a matching message from a client application; and
  - generate, for each rule determined to match the received message at the first client application cache, another message directed to another specified client application cache that triggers the processing event in the other specified client application cache that causes the other specified client application cache to perform programmatic processing to collect and cache specified information from a server associated with the other specified client application cache.

9. The client computer of claim 8, where:
- the first client application cache comprises a calendar cache associated with a client calendar application that is associated with a calendar server and the other specified client application cache comprises an address book client cache; and
- a matching rule stored in association with the calendar cache causes transmission of the respective other message to the address book client cache that causes the address book client cache to collect customer information in response to a customer meeting entered from the client calendar application.

10. The client computer of claim 8, where the first client application cache comprises a calendar cache associated with a client calendar application that is associated with a calendar server, and a matching rule stored in association with the calendar cache causes the at least one processor to transmit the respective other message to a social networking web site that causes the social networking web site to collect customer information in response to a customer meeting entered from the client calendar application.

11. The client computer of claim 10, where the social networking web site is specified in the matching rule stored in association with the calendar cache.

12. The client computer of claim 8, where the first client application cache comprises a calendar cache associated with a client calendar application that is associated with a calendar server, and a matching rule stored in association with the calendar cache causes the at least one processor to transmit the respective other message to a database that causes the database to collect customer information in response to a customer meeting entered from the client calendar application.

13. The client computer of claim 8, where each message comprises a COUNT field that comprises a positive integer, and the at least one processor causes each client application cache to decrement a value in the COUNT field and discard the respective other message in response to the respective decremented value reaching a certain value.

14. A non-transitory storage medium that contains program code that, when executed by a computer that executes at least a first client application cache, causes the first client application cache executed by the computer to:
- determine whether a message received at the first client application cache of a plurality of client application caches matches one of a set of stored rules, where each rule triggers a processing event in another one of the plurality of client application caches in response to receipt of a matching message from a client application; and
- generate, for each rule determined to match the first received message at the first client application cache, another message directed to another specified client application cache that triggers the processing event in the other specified client application cache that causes the other specified client application cache to perform programmatic processing to collect and cache specified information from a server associated with the other specified client application cache.

15. The non-transitory storage medium of claim 14, where:
- the first client application cache comprises a calendar cache associated with a client calendar application that is associated with a calendar server and the other specified client application cache comprises an address book client cache; and
- a matching rule stored in association with the calendar cache causes transmission of the respective other message to the address book client cache that causes the address book client cache to collect customer information in response a customer meeting entered from the client calendar application.

16. The non-transitory storage medium of claim 14, where the first client application cache comprises a calendar cache associated with a client calendar application that is associated with a calendar server, and a matching rule stored in association with the calendar cache causes transmission of the respective other message to a social networking web site that causes the social networking web site to collect customer information in response to a customer meeting entered from the client calendar application.

17. The non-transitory storage medium of claim 16, where the social networking web site is specified in the matching rule stored in association with the calendar cache.

18. The non-transitory storage medium of claim 14, where the first client application cache comprises a calendar cache associated with a client calendar application that is associated with a calendar server, and a matching rule stored in association with the calendar cache causes transmission of the respective other message to a database that causes the database to collect customer information in response to a customer meeting entered from the client calendar application.

19. The non-transitory storage medium of claim 14, where each message comprises a COUNT field that comprises a positive integer, and the program code further causes each client application cache to decrement a value stored in the COUNT field and discard the respective other message in response to the respective decremented value reaching a certain value.

20. The non-transitory storage medium of claim 14, where the message comprises a target date of a future event, and the program code further causes the first client application cache to delay retrieval of the cached specified information until just before the future event.

* * * * *